Patented Jan. 30, 1951

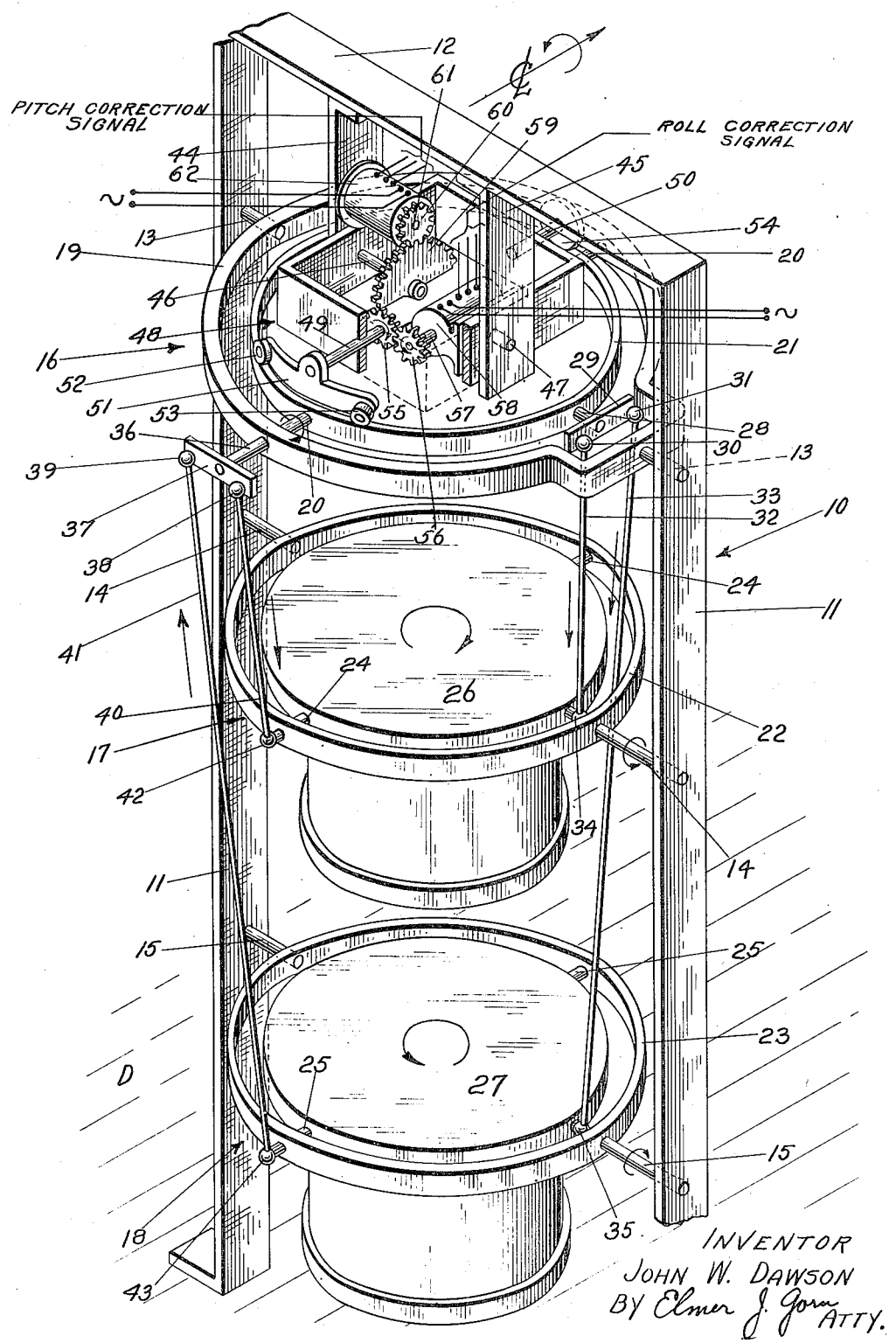

2,539,772

UNITED STATES PATENT OFFICE 2,539,772

POSITION STABILIZING DEVICE

John W. Dawson, West Newton, Mass., assignor, by mesne assignments, to Raytheon Manufacturing Company, Newton, Mass., a corporation of Delaware Application October 20, 1945, Serial No. 623,510

3 Claims. (Cl. 74—5.34)

My present invention relates to position-stabilizing devices, and more particularly to position-stabilizing devices which depend for their operation upon gyroscopic inertia.

While not limited thereto, my present invention is especially suitable for use in combination with pitch and roll compensating apparatus for maintaining the guns of a warship trained on a target notwithstanding the haphazard tossing about of the ship carrying such guns.

Existing position-stabilizing devices, which generally include a single gyroscope mounted for rotation about a vertical axis of spin, have certain disadvantages.

For example, when such a device is subjected to a positional variation in space, the gyroscope thereof becomes loaded about two of its axes, namely, its axes of torque and precession. The loading about the axis of precession causes the gyroscope to precess about the original torque axis, and this results in error being introduced into the operation of the compensating apparatus associated with the device.

Furthermore, such a single gyroscope cannot take heavy loading without interfering with the self-erecting characteristic thereof, and inasmuch as the accuracy of existing systems depends upon the spin axis of the gyroscope returning to an absolutely vertical position upon the removal of the load, the disadvantages of this defect becomes apparent.

It is, therefore, one of the objects of my present invention to provide a gyroscopic position-stabilizing device which is adapted to be loaded in one direction only, thereby eliminating the above referred to error introduced by loading in two directions.

It is another object of my present invention to provide a gyroscopic position-stabilizing device which is unaffected by loading about its axis of precession during precession.

It is a further object of my present invention to provide a gyroscopic position-stabilizing device which does not depend upon the maintenance of its axis of spin in any particular reference direction, thereby avoiding the disadvantages flowing from interference with the self-erecting characteristic thereof.

It is a still further object of my present invention to provide a gyroscopic position-stabilizing device which, not depending for its functioning upon the accurate maintenance of a reference axis, may be subjected to heavy loading of an alternating character.

These, and other objects of my present invention, which will become more apparent as the detailed description thereof progresses, are attained, briefly, in the following manner:

I provide a gimbal system about whose mutually perpendicular axes torques are applied. Such torques may result, for example, from the rotor inertia of a transmitting synchro which may comprise one of the components of an angle computing device. I further provide a pair of oppositely-rotating, free gyroscopes, and by "free," I mean gyroscopes having three degrees of freedom. A linkage system is connected between said gimbal system and each of said gyroscopes, said linkage system being so designed as to communicate the above referred to torques simultaneously to both of said gyroscopes, to so load each as to cause both equally and oppositely to precess, said linkage system being so further designed as to integrate the forces resulting from said equal and opposite precessions whereby said forces cancel each other and leave said gimbal system substantially undisturbed.

In the accompanying specification I shall describe, and in the annexed drawing show, an illustrative embodiment of the position-stabilizing device of my present invention. It is, however, to be clearly understood that I do not wish to be limited to the details herein shown and described for purposes of illustration only, inasmuch as changes therein may be made without the exercise of invention, and within the true spirit and scope of the claims hereto appended.

In said drawing, the single figure is a perspective view of a position-stabilizing device assembled in accordance with the principles of my present invention.

Referring now more in detail to the position-stabilizing device of my present invention, with particular reference to the aforesaid illustrative embodiment thereof shown in the drawing, the numeral 10 designates a frame consisting of standards 11 connected at their upper ends by a cross-piece 12, said frame rising, for example, from the deck D of a ship.

Pivotally mounted in the standards 11, as at 13—13, 14—14, and 15—15, are a controlled gimbal system 16, and two controlling gimbal systems 17 and 18.

The controlled gimbal system 16 comprises an outer ring 19, which is carried by the pivots 13—13, and in which is pivotally mounted, as at 20—20, an inner ring 21. The rings 19 and 21 are the elements whose positions my present invention seeks to stabilize.

The controlling gimbal systems 17 and 18 comprise, respectively, outer rings 22 and 23, which are carried by the pivots 14—14 and 15—15, and in which are pivotally mounted, as at 24—24 and 25—25, gyroscopes (not shown) mounted for rotation about vertical axes of spin in casings 26 and 27, the latter being, in effect, the inner rings of the controlling gimbal systems. The gyroscopes are adapted to rotate in opposite directions as indicated by the arrows on the casings 26 and 27 thereof.

The axes corresponding to the pivots 13—13, 14—14, and 15—15 shall hereinafter be referred to as the gimbal axes of their respective gimbal systems, and the axes corresponding to the pivots 20—20, 24—24, and 25—25 shall hereinafter be referred to as the gyro axes of their respective gimbal systems.

Pivotally mounted in the inner ring 21 of the controlled gimbal system 16, coincident with the gimbal axis thereof, as at 28, is a double-ended lever 29 connected, through ball-and-socket joints 30 and 31 at the outer ends thereof, with tie-rods 32 and 33, the opposite ends of said tie-rods being connected, respectively, through ball-and-socket joints 34 and 35, to the casings or inner rings 26 and 27 of the controlling gimbal systems 17 and 18, said joints 34 and 35, preferably, lying in the gimbal axes of said controlling gimbal systems 17 and 18.

Pivotally mounted in the outer ring 19 of the controlled gimbal system 16, coincident with the gyro axis thereof, as at 36, is a double-ended lever 37 connected, through ball-and-socket joints 38 and 39 at the outer ends thereof, with tie-rods 40 and 41, the opposite ends of said tie-rods being connected, respectively, through ball-and-socket joints 42 and 43, to the outer rings 22 and 23 of the controlling gimbal systems 17 and 18, said joints 42 and 43, preferably, lying in the gyro axes of said controlling gimbal systems 17 and 18.

While not limited thereto as stated in an earlier portion of this specification, the structure thus far described is especially suitable for use in combination with pitch and roll compensating apparatus for stabilizing the guns of a warship. Such compensating apparatus generally includes an angle computer which may take the following form.

Depending from the cross-piece 12 of the frame 10 is a pair of legs 44 and 45 in which there are rotatably mounted, at the lower ends thereof, shafts 46 and 47. Carried by the shafts 46 and 47 is a frame 48 in one end member of which there is rotatably mounted a shaft 49, and in the opposite end member of which there is fixed a shaft 50.

The rotatable shaft 49 has secured to its outer end a double-ended lever 51 carrying at its extremities rollers 52 and 53 which ride upon the inner ring 21 of the controlled gimbal system 16. The fixed shaft 50 has a roller 54 mounted on its outer end, said roller 54 also riding on the ring 21. The rollers 52, 53, and 54 provide three-point contact between the frame 48 and the ring 21, whereby said frame and ring are always maintained in parallel planes.

Secured upon the inner end of the shaft 49 is a pinion 55 engageable with a pinion 56 carried on the rotor shaft 57 of a transmitting synchro 58, said synchro being carried in the frame 48, and being adapted, when energized from a suitable source of alternating current, and driven as will hereinafter be described, to generate an electrical roll correction signal.

Secured upon the inner end of the shaft 46 is a gear segment 59 engageable with a pinion 60 carried on the rotor shaft 61 of a transmitting synchro 62, said synchro being carried by the leg 44 extending from the frame 10, and being adapted, when energized from a suitable source of alternating current, and driven as will hereinafter be described, to generate an electrical pitch correction signal.

This completes the description of the aforesaid illustrative embodiment of my present invention, and the mode of operation thereof may be briefly summarized as follows:

Assume, for the moment, that the ship carrying the device is rolling in the direction indicated by the arrow about the center line shown in the drawing. Such a motion tends to rock the frame 48, and the synchro 58 carried thereby, about the shaft 49. The rotor pinion 56 and the pinion 55 tend to rotate as indicated by the arrows thereon. The inertia of the synchro rotor, through the shaft 49 and lever 51, exerts a torque upon the inner ring 21 of the controlled gimbal system 16, about the gyro axis thereof, in the direction indicated by the arrow about said axis. This torque is communicated, as shown, through the tie-rods 32 and 33, to the casings or inner rings 26 and 27 of the controlling gimbal systems 17 and 18 to load their respective gyroscopes, in the same direction, about their respective gyro axes. The applied loads cause the oppositely rotating gyroscopes equally and oppositely to precess about the gimbal axes, as shown, thereby moving the tie-rods 40 and 41 in opposite directions. The latter movements are combined so as to cancel each other by the action of the lever 37, which merely pivots about the gyro axis of the controlled gimbal system 16 without loading the precessing gyroscopes, and leaves the initial plane of the inner ring 21 of said controlled gimbal system 16 undisturbed. Thus, the pinion 55 is maintained rigid, and the rotor pinion 56 rotates about the same to drive the synchro 58 and generate the above referred to roll correction signal. Roll in the opposite direction reverses the motions indicated by the various arrows, and causes the generation of an opposite signal.

The pitch of a ship acts in the same manner as above described in connection with roll, but the applied torques and resulting loads are about the gimbal axes, with equal and opposite precessions occurring about the gyro axes, leaving the initial plane of the outer ring 19 of the controlled gimbal system 16 undisturbed, causing the synchro 62 to generate a pitch correction signal.

The roll and/or pitch correction signals are conveyed to receiving synchros which, in cooperation with appropriate amplifiers, operate suitable motors to control the orientation of the final object to be stabliized, for example, a gun, the apparatus just mentioned forming no part of my present invention and therefore not being shown or described.

This completes the description of the mode of operation of the position-stabilizing device of my present invention.

It will be noted from all of the foregoing that I have provided a gyroscopic position-stabilizing device which is loaded in one direction only, which rejects loading about its axis of precession during precession, which does not require the maintenance of an accurate reference axis as long as the precessions of the gyroscopes thereof are equal and opposite, and which can take heavy alternating loads without interfering with the accurate operation thereof, as a result of all of which the disadvantages of the existing systems, set forth in earlier portions of this specification, are effectively eliminated.

Other objects and advantages of my present invention will readily occur to those skilled in the art to which the same relates.

What is claimed is:

1. In a position-stabilizing device: a supporting member adapted to be subjected to positional variations in space; a controlled gimbal system mounted in said supporting member; two controlling gimbal systems mounted in said supporting member; a gyroscope mounted in each of said controlling gimbal systems; said gyroscopes being adapted to be rotated in opposite directions about axes of spin which are angularly displaced with respect to the axes of their respective controlling gimbal systems; means, adapted to be subjected to the same positional variations in space as said supporting member, for developing torques about the axes of said controlled gimbal system; and means for engaging said controlled gimbal system with both of said controlling gimbal systems; said last-named means including a first linkage system for communicating said torques to said controlling gimbal systems simultaneously to load said gyroscopes, each about one axis only thereof, whereby both are caused equally and oppositely to precess, and a second linkage system for integrating said equal and opposite precessions, whereby the forces resulting therefrom are caused to cancel each other and leave said controlled gimbal system substantially undisturbed.

2. In a position-stabilizing device: a controlled gimbal system; two controlling gimbal systems; each of said gimbal systems including pivotally mounted inner and outer rings; a gyroscope mounted in the inner ring of each of said controlling gimbal systems; said gyroscopes being adapted to be rotated in opposite directions about axes of spin which are angularly displaced with respect to the axes of their respective controlling gimbal systems; means, adapted to act upon the rings of said controlled gimbal system, for applying torques about the axes of said controlled gimbal system; and means for engaging said controlled gimbal system with both of said controlling gimbal systems; said last-named means including two linkage systems, one connecting the inner ring of said controlled gimbal system with the inner rings of both of said controlling gimbal systems, and the other connecting the outer ring of said controlled gimbal system with the outer ring of both of said controlling gimbal systems; one of said linkage systems communicating said torques to said controlling gimbal systems simultaneously to load said gyroscopes, each about one axis only thereof, whereby both are caused equally and oppositely to precess, while the other of said linkage systems integrates said equal and opposite precessions, whereby the forces resulting therefrom are caused to cancel each other and leave the initial planes of the rings of said controlled gimbal system substantially undisturbed.

3. In a position-stabilizing device: a controlled gimbal system; two controlling gimbal systems; each of said gimbal systems including pivotally mounted inner and outer rings; a gyroscope mounted in the inner ring of each of said controlling gimbal systems; said gyroscopes being adapted to be rotated in opposite directions about axes of spin which are angularly displaced with respect to the axes of their respective controlling gimbal systems; means for applying torques about the axes of said controlled gimbal system; and a pair of linkage systems connecting said controlled gimbal system with both of said controlling gimbal systems; said linkage systems communicating said torques to said controlling gimbal systems simultaneously to load said gyroscopes, each about one axis only thereof, whereby both are caused equally and oppositely to precess, and integrating said equal and opposite precessions, whereby the forces resulting therefrom are caused to cancel each other and leave the initial planes of the rings of said controlled gimbal system substantially undisturbed; one of said linkage systems including a lever pivotally mounted at its center in the inner ring of said controlled gimbal system, and having its ends connected by tie-rods, respectively, to the inner rings of said controlling gimbal systems, and the other linkage system including a lever pivotally mounted at its center in the outer ring of said controlled gimbal system, and having its ends connected by tie-rods, respectively, to the outer rings of said controlling gimbal systems.

JOHN W. DAWSON.

REFERENCES CITED

The following references are of record in the file of this patent:

UNITED STATES PATENTS

| Number | Name | Date |
|---|---|---|
| 1,050,153 | Mamonier | Jan. 14, 1913 |
| 1,066,860 | Sparmann | July 8, 1913 |
| 1,186,856 | Sperry | June 13, 1916 |
| 1,324,477 | Tanner | Dec. 9, 1919 |
| 1,429,583 | Hayford et al. | Sept. 19, 1922 |
| 1,545,812 | Chessin | July 14, 1925 |
| 1,645,079 | Titterington | Oct. 11, 1927 |
| 1,735,058 | Schuler | Nov. 12, 1929 |

FOREIGN PATENTS

| Number | Country | Date |
|---|---|---|
| 24,112 | Great Britain | 1909 |
| 86,520 | Sweden | June 9, 1936 |